(12) United States Patent
Riefe

(10) Patent No.: US 6,814,374 B2
(45) Date of Patent: Nov. 9, 2004

(54) STEERING COLUMN WITH FOAMED IN-PLACE STRUCTURE

(75) Inventor: Richard K. Riefe, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/184,464

(22) Filed: Jun. 28, 2002

(65) Prior Publication Data

US 2004/0000782 A1 Jan. 1, 2004

(51) Int. Cl.$^7$ ............................................. B62D 1/18
(52) U.S. Cl. ........................................................ 280/779
(58) Field of Search ................................ 280/779, 777; 74/492; 52/735.1, 737.4, 737.6, 309.7, 309.9, 309.11

(56) References Cited

U.S. PATENT DOCUMENTS

| | | | | |
|---|---|---|---|---|
| 2,576,073 A | * | 11/1951 | Kropa et al. ............... | 156/77 |
| 3,331,174 A | * | 7/1967 | Wesch et al. ............. | 52/309.11 |
| 3,538,783 A | * | 11/1970 | Butts ........................... | 74/492 |
| 3,572,156 A | * | 3/1971 | Grancon ...................... | 74/492 |
| 3,724,286 A | * | 4/1973 | Kitzner et al. ................ | 74/492 |
| 3,888,502 A | * | 6/1975 | Felzer et al. ................ | 280/784 |
| 3,968,561 A | * | 7/1976 | Oakes et al. ................. | 29/460 |
| 3,980,314 A | * | 9/1976 | Kopf ........................... | 280/777 |
| 4,009,622 A | * | 3/1977 | Hinderks ...................... | 74/492 |
| 4,643,448 A | * | 2/1987 | Loren .......................... | 280/777 |
| 4,762,352 A | * | 8/1988 | Enomoto ..................... | 293/120 |
| 4,903,446 A | * | 2/1990 | Richards et al. ........... | 52/223.6 |
| 5,213,391 A | * | 5/1993 | Takagi ......................... | 296/205 |
| 5,761,966 A | | 6/1998 | Cuiller et al. | |
| 5,870,930 A | * | 2/1999 | Willett et al. ................. | 74/492 |
| 5,888,600 A | * | 3/1999 | Wycech ..................... | 428/35.9 |
| 6,040,350 A | * | 3/2000 | Fukui ......................... | 521/135 |
| 6,096,403 A | * | 8/2000 | Wycech ...................... | 428/122 |
| 6,134,983 A | | 10/2000 | Armstrong et al. | |
| 6,138,525 A | | 10/2000 | Riefe et al. | |
| 6,389,924 B1 | | 5/2002 | Ryne et al. | |
| 6,435,555 B1 | | 8/2002 | Seamon et al. | |
| 6,517,114 B1 | | 2/2003 | Scheib et al. | |
| 6,586,110 B1 | * | 7/2003 | Obeshaw ..................... | 428/593 |

* cited by examiner

*Primary Examiner*—Charles T. Jordan
*Assistant Examiner*—Bret Hayes
(74) *Attorney, Agent, or Firm*—Michael D. Smith

(57) ABSTRACT

A composite steering column jacket including a pair of composite sections joined along a flange area. The composite sections include outer and inner walls spaced coaxially from each other, that mate at first and second flanges. A cavity is defined by the space between the inner and outer walls and is filled with a foam material that is disposed within. The composite steering column jacket has an increased stiffness and reduced weight when compared to conventional metal steering column jackets.

6 Claims, 2 Drawing Sheets

STEERING COLUMN WITH FOAMED IN-PLACE STRUCTURE

TECHNICAL FIELD

This invention relates to a steering column jacket, and more particularly, to a steering column jacket having a composite structure including a foam material.

BACKGROUND OF THE INVENTION

Generally, beamed structures are used to support a steering column structure. The beams, often referred to as steering column jackets, are metal tubes having sufficient strength to support the forces encountered during a vehicle collision. Current jackets are generally manufactured from either of two metal-forming processes, including welding stampings and tubings, as well as utilizing cast metal parts. The metal jackets are designed with the necessary strength to support the forces exerted during a vehicle collision, however, further improvement, including reducing the overall weight and improving strength characteristics is desirable.

Also, an improvement of a steering column jacket to dampen vibrations produced during travel over rough roads would be desirable. By eliminating a portion of the weight of conventional steering metal column jackets, an overall weight reduction to a vehicle may be achieved yielding a higher gas mileage.

There is therefore a need for a composite steering column jacket that is lighter in weight when compared with metal steering column jackets, and has improved dampening characteristics, without a sacrifice in strength.

BRIEF DESCRIPTION OF THE EMBODIMENT

A composite steering column jacket including a pair of composite sections joined along a flange area. The composite sections are formed of an outer wall having inner and outer surfaces. The outer wall also includes a first flange formed thereon. An inner wall having inner and outer surfaces is spaced coaxially from the outer wall. The inner wall also includes a second flange that mates with the first flange of the outer wall. A cavity defined by the space between the inner surface of the outer wall and the outer surface of the inner wall has foam material disposed within. The composite steering column jacket has an increased stiffness and reduced weight in comparison to a conventional metal steering column jacket.

In an alternative embodiment, an aluminum foam is attached to the outer surfaces of the inner and outer walls to strengthen the overall structure of the composite steering column jacket, in lieu of the foam contained within the cavity

BRIEF DESCRIPTION OF THE DRAWINGS

These features and advantages of the present invention will become more readily appreciated when considered in connection with the following detailed description and appended drawings, where.

DETAILED DESCRIPTION OF THE PREFERRED EMBODIMENTS

Figure 1:
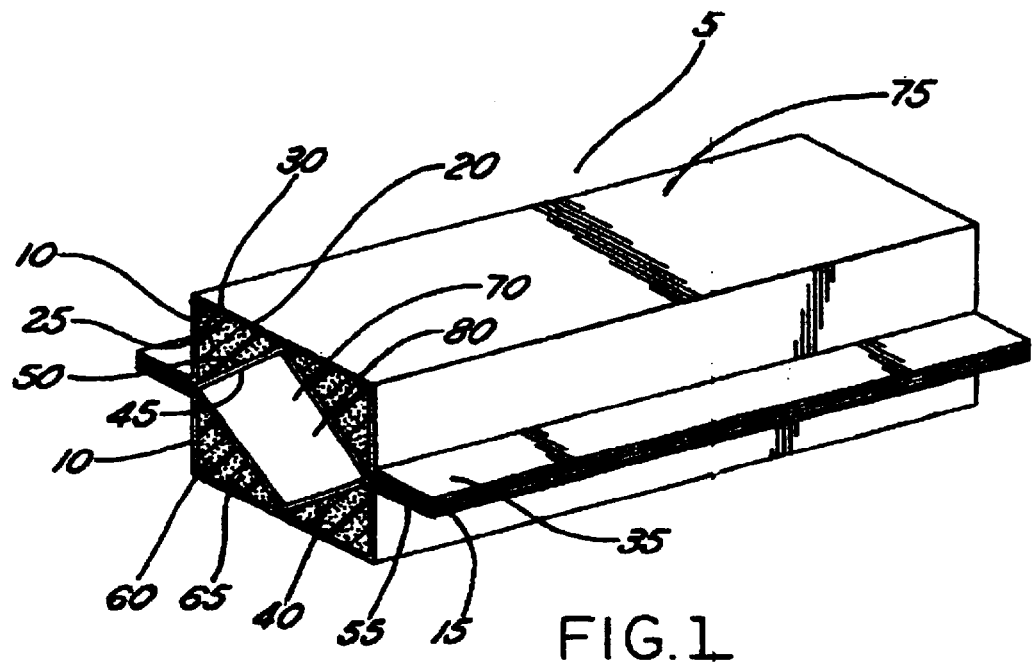
FIG. 1 is a perspective view of a first embodiment of the composite steering column jacket of the present invention.

Referring to FIG. 1, there is shown the composite steering column jacket 5 of the present invention. The composite steering column jacket 5 comprises a pair of composite sections 10 joined along a flange area 15. Each of the composite sections 10 includes an outer wall 20 having inner 25 and outer 30 surfaces. The outer wall 20 includes a first flange 35 formed thereon. An inner wall 40 having inner 45 and outer 50 surfaces is coaxially spaced from the outer wall 20. The inner wall 40 also includes a second flange 55 formed thereon that mates with the first flange 35 of the outer wall 20. A cavity 60 is defined by the space between the inner surface 25 of the outer wall 20 and the outer surface 50 of the inner wall 40. A foam material 65 is disposed within the cavity 60.

Figure 3A:
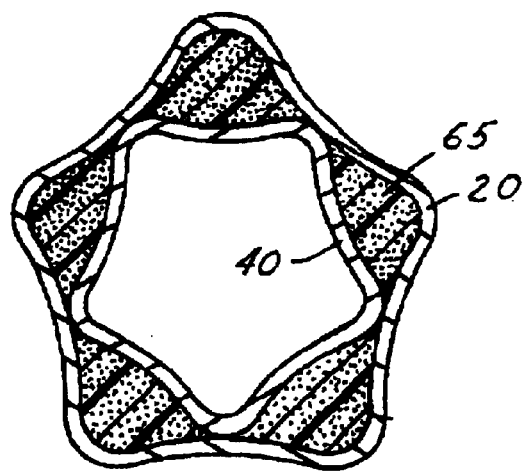
FIGS. 3A–C details various cross-sectional views of alternative shapes of the composite steering column jacket of the present invention.
Figure 3B:
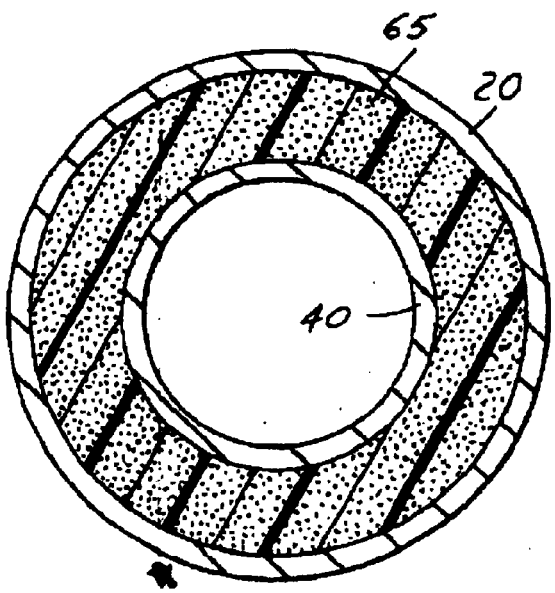
Figure 3C:
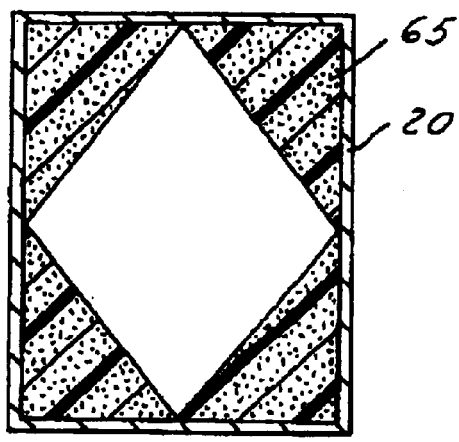

As can be seen in FIG. 1, the pair of composite sections 10 forms an annular structure 70 having an outer dimensional shape 75 and an inner dimensional shape 80. As shown in FIG. 1 in a preferred embodiment, the outer wall 20 and inner wall 40 are formed such that when mated as a pair, the shape is rectangular. As shown in the pictured preferred embodiment, the outer wall 20 is bent such that it forms a U-shaped section having flanges 35 on its outer edges, and the inner wall 40 is bent such that it has a V-shape, again with flanges 55 formed on its edges. The metal sheet of the outer 20 and inner 40 walls may be bent on a metal brake or other metal forming apparatus to form the shapes of the outer 20 and inner wall 40. While in the pictured preferred embodiment, the pair of composite sections 10 forms an annular structure 70 that is rectangular in its outer dimension 75 as well as its inner dimension 80, other shapes and structures are contemplated for use by the present invention. For example, as shown in FIGS. 3A–C, other cross-sectional shapes (shown without a flange) such as square, circular, ovoid, pentagonal, hexagonal, or other shapes may be utilized to form the outer dimensional shape 75 and inner dimensional shape 80 of the annular structure 70. The only limitation as to the various shapes and structures is that the composite steering column jacket 5 have the requisite strength and characteristics for use in an automotive application.

In the picture preferred embodiment of FIG. 1, the cavity 60 defined by the space between the inner surface 25 of the outer wall 20 and the outer surface 50 of the inner wall 40 is filled with a foam material that preferably comprises a polyurethane foam. The polyurethane foam acts as a damping agent to absorb vibrations produced while driving. The polyurethane foam also provides a rigidity when cured to the composite steering column jacket 5 by filling the cavity 60 between the outer 20 and inner 40 walls. The overall weight of the composite structure is less than that of a conventional metal steering column jacket and provides increased dampening and strength characteristics.

When forming the composite sections 10 of the present invention, the outer wall 20 and inner wall 40 are shaped on metal forming rolling dies to an appropriate shape as determined by the application. The four flanges comprising the first 35 and second 55 flanges of the pair of composite sections 10 are seam welded, while polyurethane foam is injected in place. A continuous manufacturing process may be utilized to shape the walls from coils of sheet metal and wherein foam is injected to expand and harden while the halves of the parts are brought together for fastening at the flanges. The proper lengths of steering column jackets may then be cut from the continuously manufactured steering column jacket 5 for use in a variety of vehicles. The flange area 15 comprises the portion of the first 35 and second 55 flanges that are joined to form a seam. The flange area 15 of the first of the pair of composite sections is joined with the flange area 15 of the second of the pair of composite sections 10 to form the composite steering column jacket 5. The actual order in which the flanges 35, 55 are joined may vary depending on the desired processing used by the manufacturer. For example, the first 35 and second 55 flanges may be seam welded to provide a seal and then a second of the pair of composite sections 10 may have the first 35 and second flanges 55 seam welded wherein the flange area 15 formed in the first of the pair is then seam welded with the flange area 15 of the second of the pair of composite sections 10 to form the composite steering column jacket 5. However, all four flanges 35, 55 may be joined in a single operation, such as that referred to above wherein the flanges 35, 55 are joined and polyurethane foam is injected into the cavity 65. The order in which the flanges 35, 55 are sealed is not limiting on the inventive aspect of the composite steering column jacket 5 of the present invention.

Figure 2:
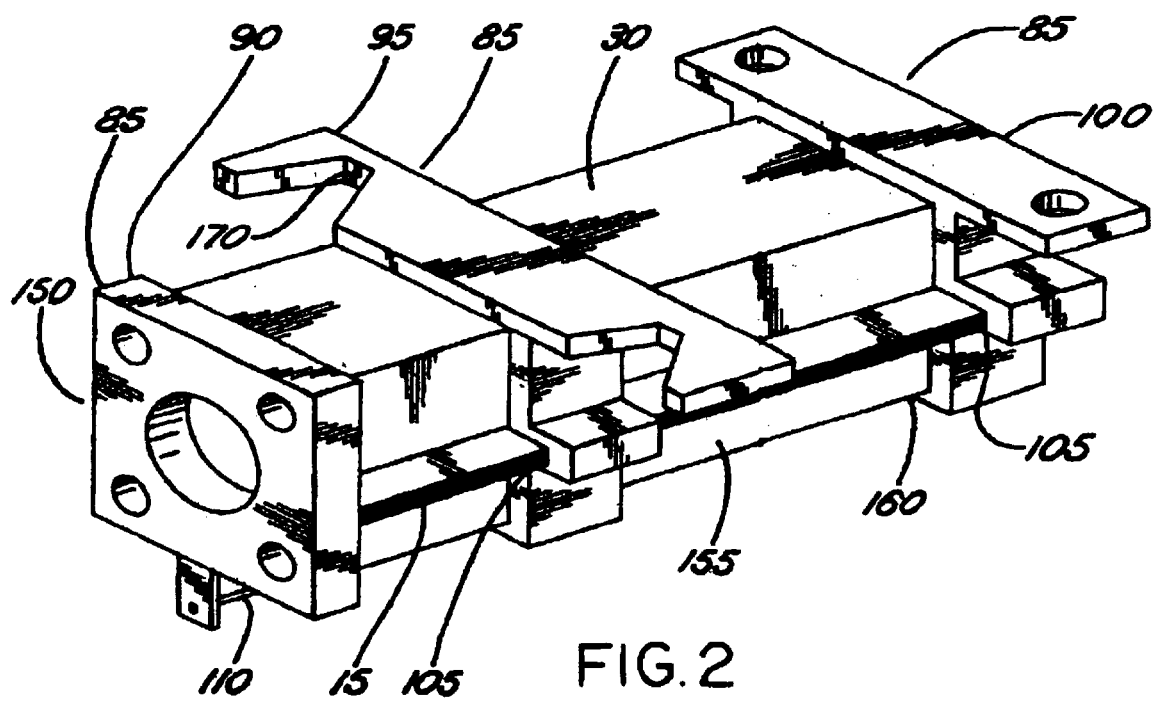
FIG. 2 is an assembled perspective view showing the first embodiment of the present invention including the mounting brackets.

In a first embodiment of the composite steering column jacket 5, as shown in FIG. 2, there is preferably included at least one mounting bracket 85 attached to the outer surface 30 of the outer wall 20. In a preferred embodiment, three mounting brackets including an adapter bracket 90, shear bracket 95, and a lower bracket 100 are attached to the outer surface 30 of the outer wall 20. The adapter bracket 90 is preferably positioned at a top end 150 of the steering column jacket 5 and is designed to receive the upper steering column on which a hand wheel is positioned. The shear bracket 95 and lower bracket 100 are positioned along a mid-portion 155 and lower end 160 respectively of the steering column jacket 5. The shear bracket 95 includes notches 170 formed therein wherein plastic pins are injected to provide a breakaway feature commonly utilized in collapsible steering columns. The shear bracket 95 and lower bracket 100 include channel portions 105 for receiving the flange area 15 of the pair of composite sections 10. The channel 105 allows the brackets 95, 100 to be slid in place for ease of manufacture without having to remove portions of the flange area 15 to allow mounting of the brackets 95, 100. All of the mounting brackets 85 including the adapter bracket 90, shear bracket 95, and lower bracket 100 are attached to the outer surface 30 of the outer wall 20. The brackets 85 may be bonded with adhesive, or other fastening means to provide a reliable bond.

Again with reference to FIG. 2, in a first embodiment the composite steering column jacket 5 includes a pre-stress cable 110 attached to the adapter bracket 90 and the lower bracket 100. The pre-stress cable 110 is maintained under tension to provide a compression force to the composite steering column jacket 5 for negating a shear force that may be placed on the composite steering column jacket 5 during a crash. The pre-stress cable 110 is manufactured such that it is attached to the adapter bracket 90 and lower bracket 100 under a stressed condition. Specifically, a tension can be applied to the pre-stress cable 110 to place a compression load on the composite steering column jacket 5 as desired by a manufacturer.

Figure 4:
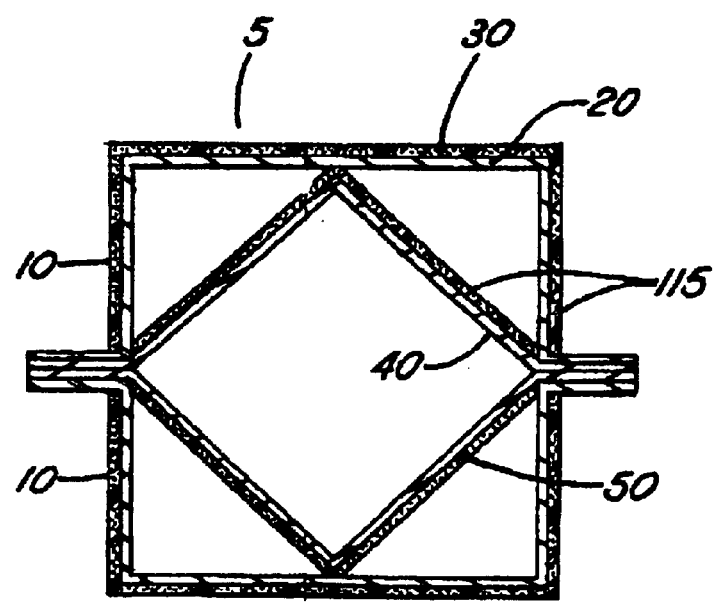
FIG. 4 is a cross-sectional view of the composite steering column jacket detailing the aluminum foam attached to the outer surfaces of the inner and outer walls.

With reference to FIG. 4, there is shown a second embodiment of the composite steering column jacket 5 of the present invention. The second embodiment is identical to that of the first embodiment with the exception that rather than disposing a foam material 65 within a cavity 60 as disclosed in the first embodiment, a foam material 115 is disposed on the outer surfaces 30, 50 of the outer 20 and inner 40 walls, respectively. Preferably the foam material 115 comprises an aluminum foam that provides a stiffness and strength to the outer 20 and inner 40 walls of the composite sections 10. A particularly preferred aluminum foam includes that manufactured by ERG material and Aerospace Corporation under the trademarked name DUOCEL®. When manufacturing a composite steering column jacket 5 according to the second embodiment, the aluminum foam 115 may be applied to the outer surfaces 30, 50 of the outer 20 and inner 40 walls with the exception of the flange areas 35, 55 prior to sealing the flanges 35, 55 as described in the manufacturing process disclosed in the first embodiment. Alternatively, the flanges 35, 55 may be seam welded while the foam 115 is being applied to the outer surfaces 30, 50 in a continuous manufacturing process.

While preferred embodiments are disclosed, a worker in this art would understand that various modifications would come within the scope of the invention. Thus, the following claims should be studied to determine the scope and content of the invention.

What is claimed is:

1. A composite steering column jacket assembly comprising:

a longitudinally extending outer tubular wall member;

a longitudinally extending inner tubular wall member disposed in said outer tubular wall member and defining a space between said inner and outer tubular wall members;

said inner and outer tubular wall members joined immovably to one another by at least one longitudinally extending side flange, wherein said a least one longitudinally extending side flange includes first and second longitudinally extending side flanges;

including foam material disposed in said space; and at least one mounting bracket fabricated separately from said inner and outer tubular wall members and coupled to said first and second flanges, wherein there are three of said mounting brackets including an adapter bracket, a shear bracket and a lower bracket, and including a cable extending between said adapter bracket and said lower bracket.

2. The assembly of claim 1 wherein said outer tubular wall member is constructed of two halves joined at said first and second flanges.

3. The assembly of claim 2 wherein said inner tubular wall member is fabricated of two halves joined at said first and second flanges.

4. The assembly of claim 1 including at least two mounting brackets coupled to said first and second flanges.

5. The assembly of claim 1 wherein said cable is under constant tension exerting a compressive load to said adapter and lower brackets and thereby to said outer and inner tubular wall members.

6. The assembly of claim 1 wherein said outer and inner tubular wall members are fabricated of formed metal sheet material.

* * * * *